United States Patent [19]

Jones et al.

[11] Patent Number: 4,852,046

[45] Date of Patent: Jul. 25, 1989

[54] IMPROVEMENTS IN OR RELATING TO BURNER CONTROL SYSTEM

[75] Inventors: Gregory E. Jones, Catherine-de-Baines; Barry L. Price, Knowle, both of England

[73] Assignee: British Gas Corporation, London, England

[21] Appl. No.: 196,761

[22] Filed: May 16, 1988

Related U.S. Application Data

[63] Continuation of Ser. No. 895,866, Aug. 12, 1986, abandoned.

[30] Foreign Application Priority Data

Aug. 12, 1985 [GB] United Kingdom ............... 8520185

[51] Int. Cl.⁴ .............................................. G05B 9/00
[52] U.S. Cl. ................................. 364/184; 364/140
[58] Field of Search ............... 364/140, 146, 184, 185, 364/186; 371/3, 49

[56] References Cited

U.S. PATENT DOCUMENTS

| | | | |
|---|---|---|---|
| 3,825,894 | 7/1974 | Johnson, Jr. | 371/3 |
| 4,075,707 | 2/1978 | Wilmer | 364/900 |
| 4,107,649 | 8/1978 | Kurihara | 371/3 |
| 4,412,280 | 10/1983 | Murphy et al. | 364/200 |
| 4,507,784 | 3/1985 | Procter | 371/3 |
| 4,567,556 | 1/1986 | Onogi et al. | 364/140 |
| 4,581,697 | 4/1986 | Jamieson et al. | 364/143 |
| 4,670,876 | 6/1987 | Kirk | 371/3 |

FOREIGN PATENT DOCUMENTS 2133903 4/1986 United Kingdom .

Primary Examiner—Allen MacDonald
Attorney, Agent, or Firm—Oblon, Spivak, McClelland, Maier & Neustadt

[57] ABSTRACT

A burner control system includes an input interface 10 for receiving burner status inputs. These are passed to address bus 14 and used to access addresses within EPROM 18. Data at the accessed addresses are output on bus 20 to control the burner via output interface 23 with related relays. Oscillator 16 and counter 17 sequence the selected address areas of the EPROM via bus 15 and a start up sequence, for example, can thus be effected. Incorrect status of the inputs from input block 10, flame detector 12 or the internal system checks in blocks 28 or 29 to bus 14 will cause the EPROM to be addressed at locations which contain data in a form that will cause shutdown or lockout via relay 25. Parity check block 22 also actuates lockout if errors are detected. System status can be provided by display 19.

48 Claims, 14 Drawing Sheets

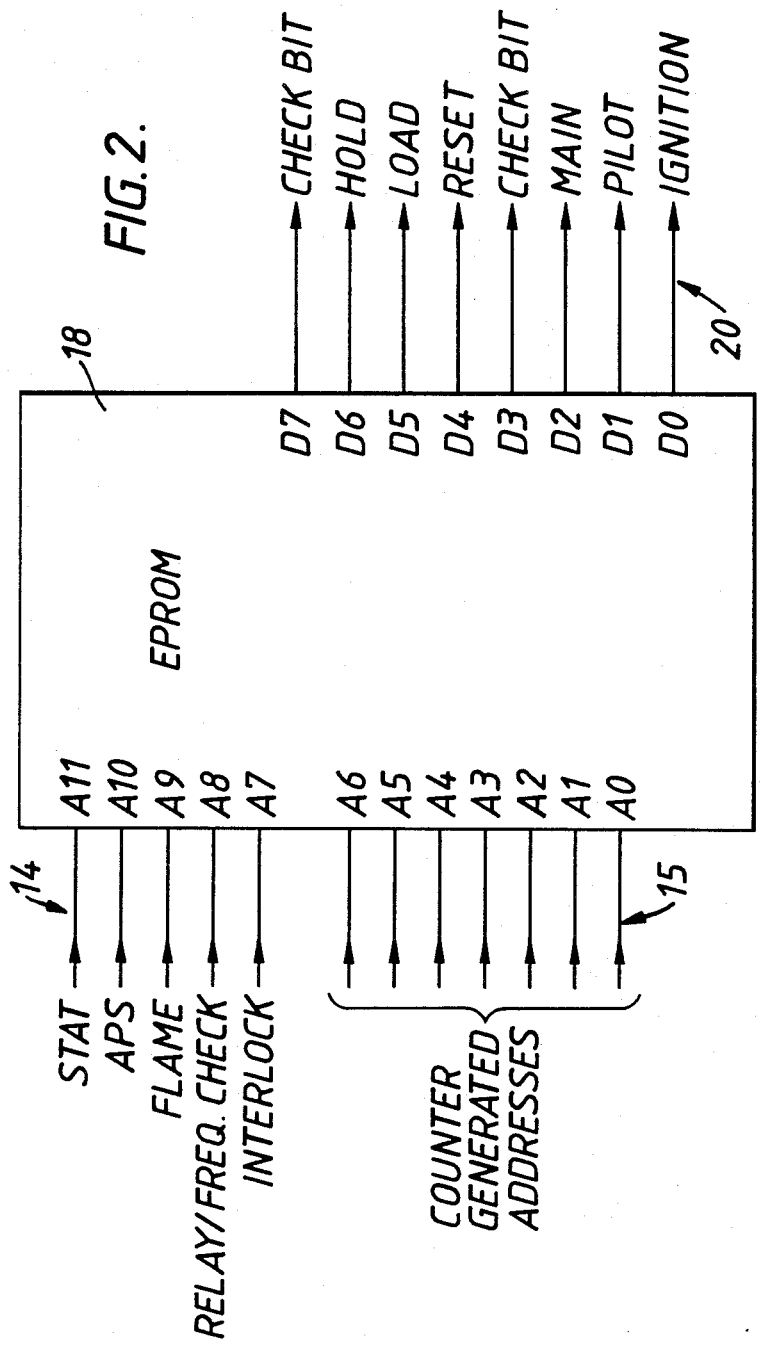

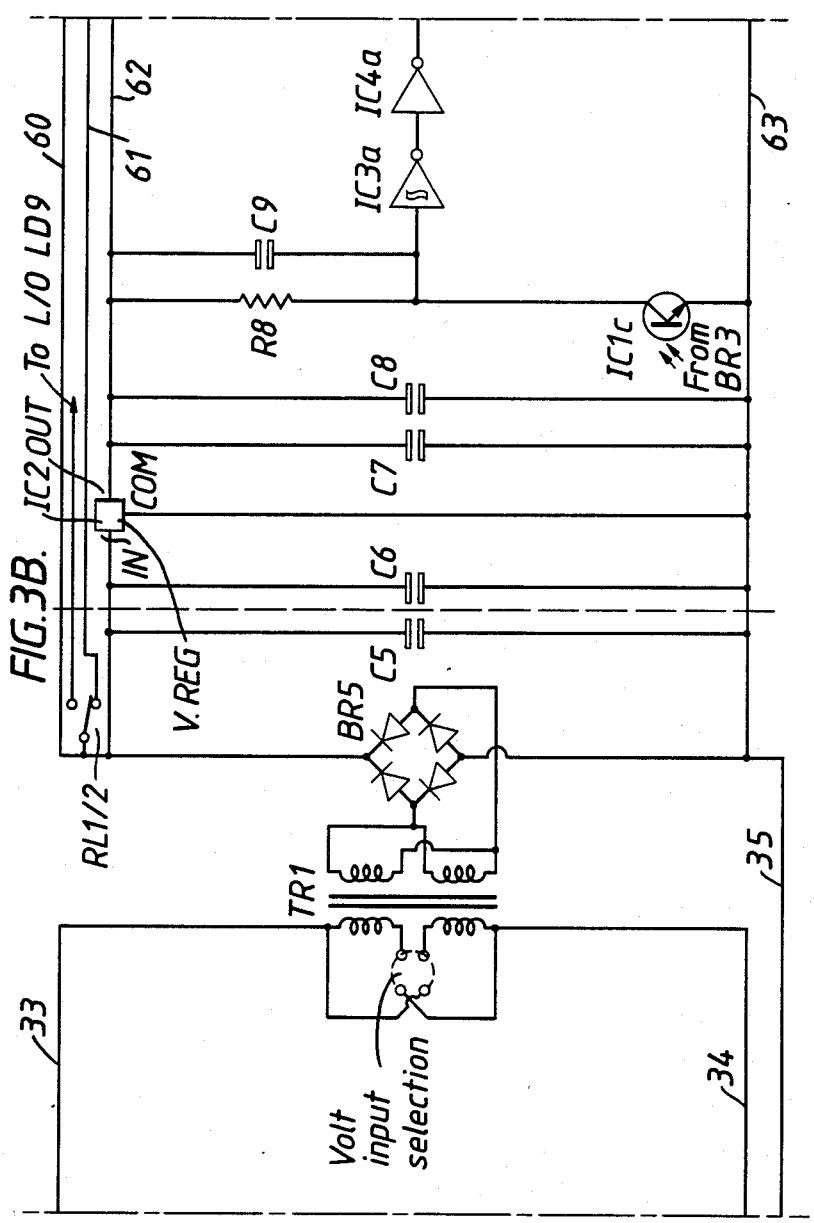

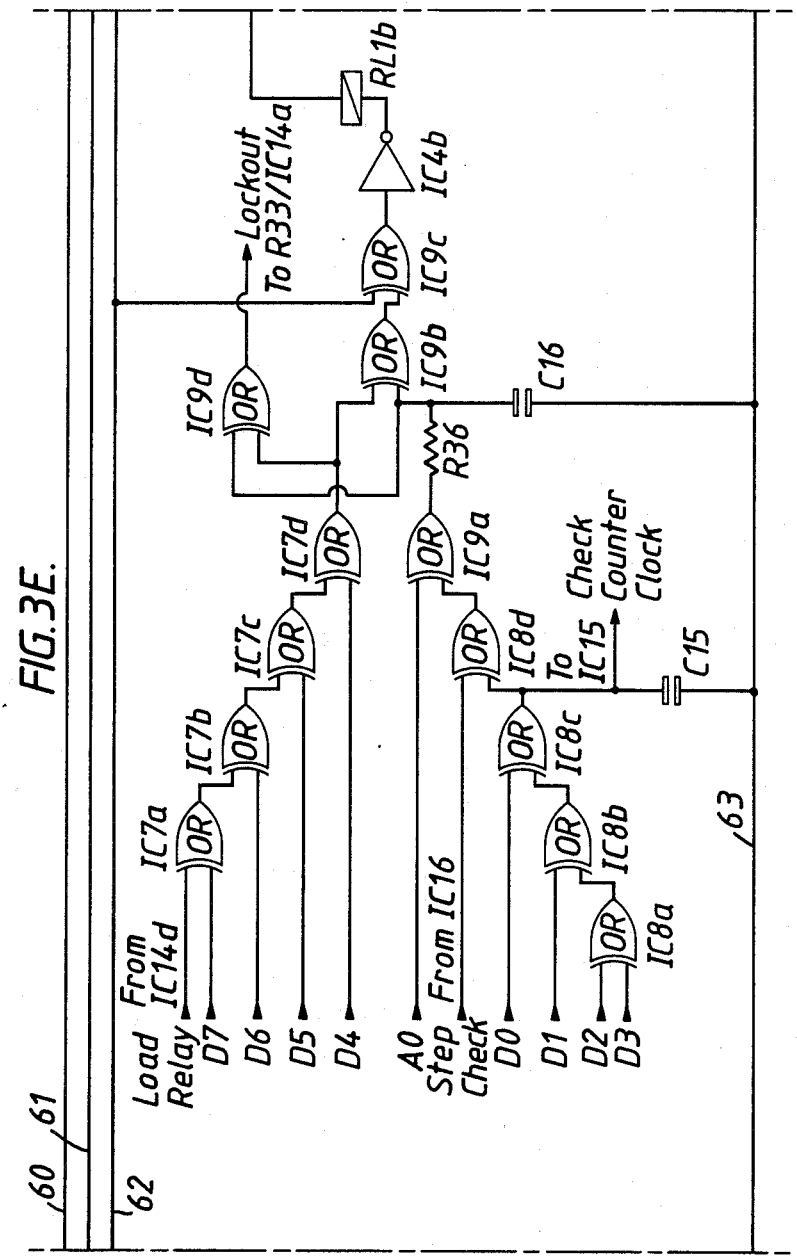

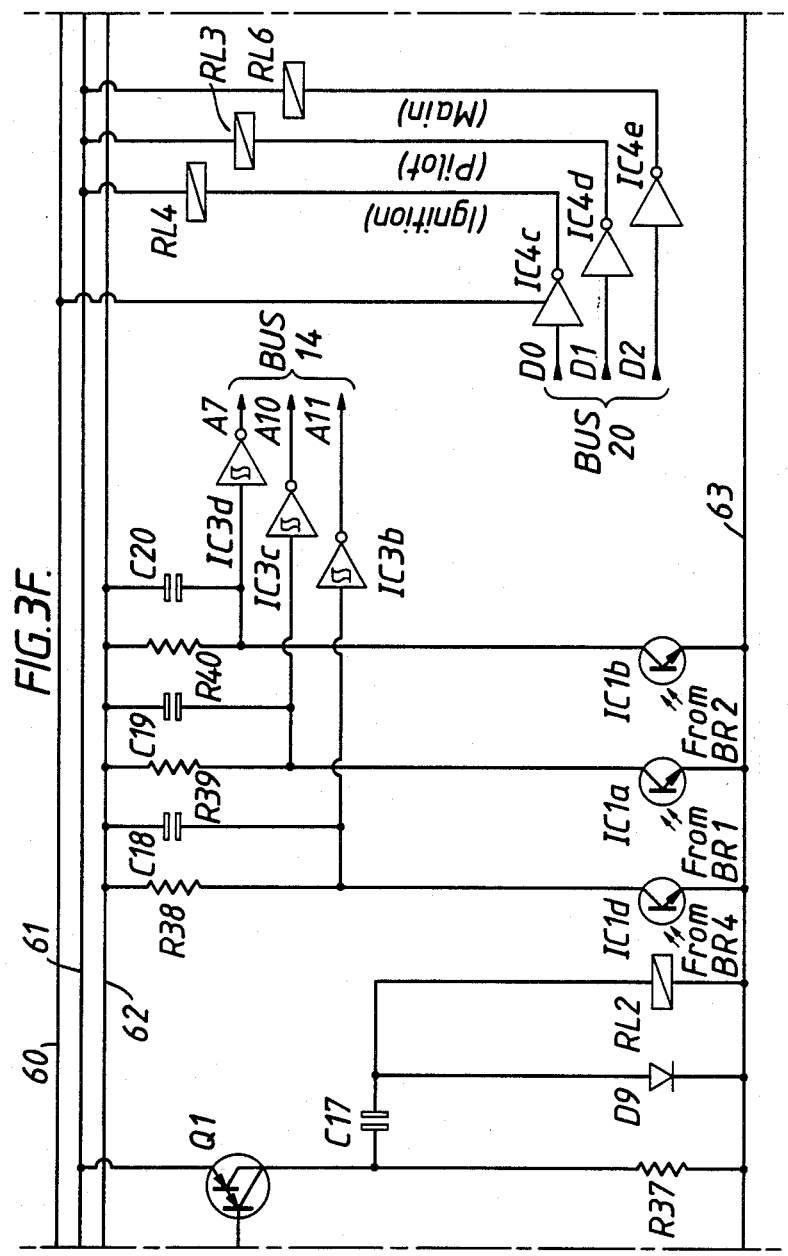

FIG. 4A.

| | EPROM ADDRESS | ADDRESS BUS | | | | | | | INPUTS BUS | | | | | DATA BUS | | | | | | | |
|---|---|---|---|---|---|---|---|---|---|---|---|---|---|---|---|---|---|---|---|---|---|
| | | A0 | A1 | A2 | A3 | A4 | A5 | A6 | A7-INT | A8-R/CHECK | A9-FLAME | A10-APS | A11-STAT | D0-IGN | D1-PILOT | D2-MAIN | D3-CHECK | D4-RESET | D5-LOAD | D6-HOLD | D7-CHECK |
| a | 0 | 0 | 0 | 0 | 0 | 0 | 0 | 0 | 0 | 0 | 0 | 0 | 0 | 0 | 0 | 0 | 0 | 0 | 0 | 0 | 1 |
| | 1 | 1 | 0 | 0 | 0 | 0 | 0 | 0 | 0 | 0 | 0 | 0 | 0 | 0 | 0 | 0 | 1 | 1 | 0 | 0 | 0 |
| | 2 | 0 | 1 | 0 | 0 | 0 | 0 | 0 | 0 | 0 | 0 | 0 | 0 | 0 | 0 | 0 | 0 | 1 | 0 | 0 | 0 |
| b | 2048 | 0 | 0 | 0 | 0 | 0 | 0 | 0 | 0 | 0 | 0 | 0 | 1 | 0 | 0 | 0 | 0 | 0 | 0 | 0 | 1 |
| | 2049 | 1 | 0 | 0 | 0 | 0 | 0 | 0 | 0 | 0 | 0 | 0 | 1 | 0 | 0 | 0 | 1 | 0 | 0 | 0 | 1 |
| | 2050 | 0 | 1 | 0 | 0 | 0 | 0 | 0 | 0 | 0 | 0 | 0 | 1 | 0 | 0 | 0 | 0 | 0 | 0 | 0 | 0 |
| c | 2304 | 0 | 0 | 0 | 0 | 0 | 0 | 0 | 0 | 1 | 0 | 0 | 1 | 0 | 0 | 0 | 0 | 0 | 0 | 0 | 1 |
| | 2305 | 1 | 0 | 0 | 0 | 0 | 0 | 0 | 0 | 1 | 0 | 0 | 1 | 0 | 0 | 0 | 1 | 0 | 0 | 0 | 1 |
| | 2306 | 0 | 1 | 0 | 0 | 0 | 0 | 0 | 0 | 1 | 0 | 0 | 1 | 0 | 0 | 0 | 0 | 0 | 0 | 0 | 1 |
| | 2307 | 1 | 1 | 0 | 0 | 0 | 0 | 0 | 0 | 1 | 0 | 0 | 1 | 0 | 1 | 0 | 0 | 0 | 0 | 0 | 1 |
| | 2308 | 0 | 0 | 1 | 0 | 0 | 0 | 0 | 0 | 1 | 0 | 0 | 1 | 0 | 0 | 0 | 0 | 0 | 0 | 0 | 0 |

| | | | | | | | | | | | | | | | | | | | | |
|---|---|---|---|---|---|---|---|---|---|---|---|---|---|---|---|---|---|---|---|---|
| 3637 | 1 | 0 | 1 | 1 | 0 | 1 | 1 | 0 | 0 | 1 | 1 | | 0 | 1 | 1 | 1 | 0 | 1 | 0 | 0 |
| 3638 | 0 | 1 | 1 | 1 | 1 | 1 | 0 | 0 | 1 | 1 | 1 | | 1 | 1 | 0 | 1 | 1 | 0 | 0 | 0 |
| 3639 | 1 | 1 | 1 | 1 | 1 | 1 | 0 | 0 | 1 | 1 | 1 | | 0 | 0 | 0 | 1 | 1 | 1 | 0 | 0 |
| 3640 | 0 | 0 | 0 | 1 | 0 | 1 | 0 | 0 | 1 | 1 | 1 | | 0 | 1 | 0 | 1 | 1 | 1 | 1 | 1 |
| | | | | | | | | | | | | | | | | | | | | |
| 3128 | 0 | 0 | 0 | 1 | 0 | 1 | 0 | 0 | 0 | 1 | 1 | | 0 | 0 | 0 | 0 | 0 | 0 | 0 | 0 |
| | | | | | | | | | | | | | | | | | | | | |
| 2616 | 0 | 0 | 0 | 1 | 0 | 1 | 0 | 1 | 0 | 1 | 1 | | 0 | 0 | 0 | 0 | 0 | 1 | 0 | 0 |
| | | | | | | | | | | | | | | | | | | | | |
| 1592 | 0 | 0 | 0 | 1 | 0 | 1 | 0 | 1 | 1 | 1 | 0 | | 0 | 0 | 1 | 0 | 0 | 1 | 0 | 0 | ns
IMPROVEMENTS IN OR RELATING TO BURNER CONTROL SYSTEM

This application is a continuation of application Ser. No. 895,866, filed on Aug. 12, 1986, now abandoned.

The invention relates to a burner control system. In such a system there is a requirement to control and monitor a sequence of operations to ensure safe and correct operation. Recently microprocessor based systems have been devised to execute such control. Such microprocessor systems rely upon the execution of a complex series of instructions for their operation, the microprocessor interpreting the state of the various inputs and indirectly effecting control of the outputs depending on logical decisions. Generation of such programs of instructions are very time consuming and therefore costly. Because of the safety aspects associated with gas burners, for example, integrity of operation is essential. Failure modes of microprocessors are numerous and complex and extremely difficult to assess. In addition, the complex nature of the program required, written in a low level language, may introduce additional areas where the safety of the system may be jeopardized.

The present invention seeks to minimise such problems whilst retaining sufficient control aptitude to safely operate as part of the burner system.

According to the invention there is provided a burner control system comprising input means for receiving a plurality of inputs indicative of the status of the burner system, output means for providing a plurality of outputs for controlling burner operation, and control memory means for effecting a sequence of control events for the output means to control burner operation, said memory means being configured to allow the sequence therefrom to be modified in dependence on the inputs received at the input means.

According to a further aspect of the invention there is provided a parity check circuit comprising a plurality of logic gates connected to a plurality of data inputs for monitoring the parity status thereof, and including at least one test signal input for receiving a recurring test signal to cause a change in the parity check status if a gate is inoperable.

According to a further aspect of the invention there is provided a relay operation system including a load relay for powering the device, a lockout relay for deactivating the device, a detector circuit for sensing short duration signals, generator means for providing a succession of short duration signals for input to the detector circuit via the coil of the lockout relay and means for powering the load relay in response to the detected signal succession whereby a check on the continuity of the lockout relay coil and the powering of the output relay is effected by the same signal.

According to a further aspect of the invention there is provided a relay contact check circuit including a resistor configuration operable as a voltage divider network and arranged to be selectively connectible in dependence on the positions of the relay contacts to be checked and voltage sensing means for detecting at least one voltage level derived therefrom indicative of operational status.

The invention will now be described by way of example with reference to the accompanying drawings in which:

FIG. 2 shows the EPROM with addressing and data lines in more detail,

FIGS. 3A-3H show one arrangement for the FIG. 1 and 2 configurations; and

FIGS. 4A-4D show a chart of EPROM addresses accessed and data stored therein for a typical burner operational sequence.

Figure 1:
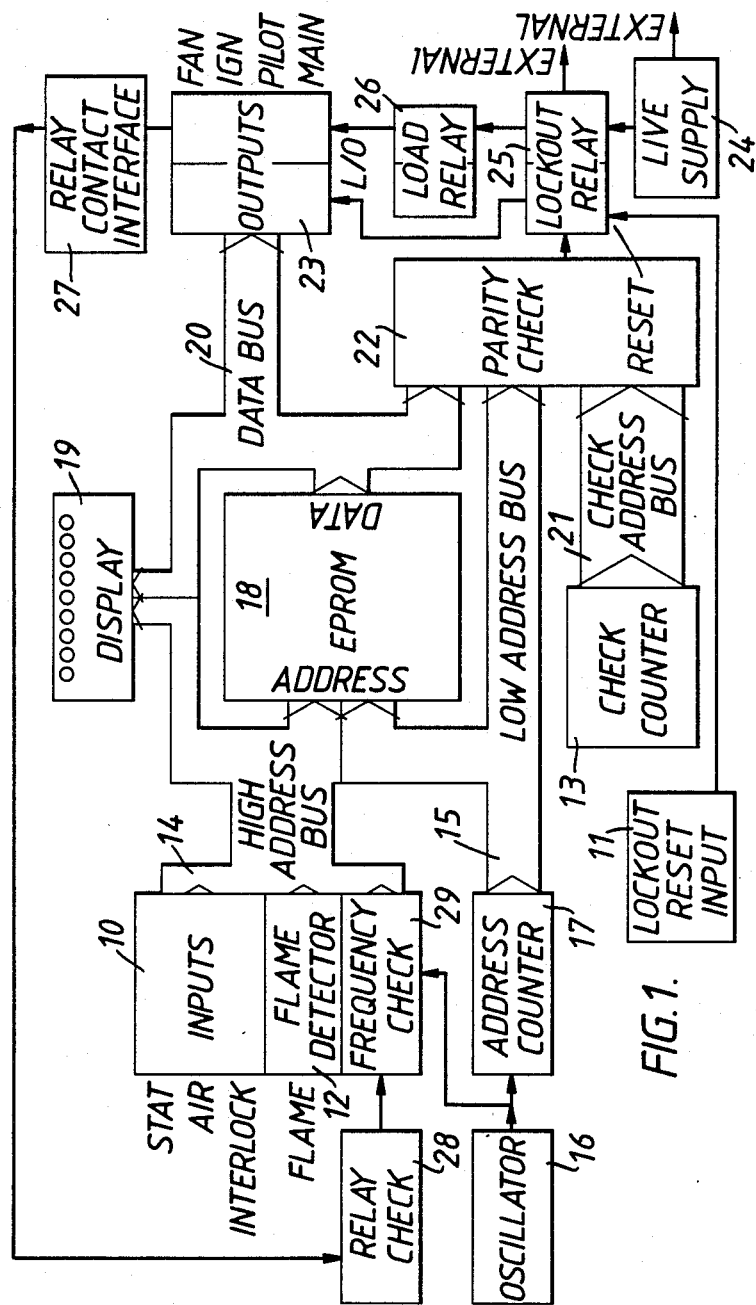
FIG. 1 shows a simplified block diagram of one embodiment of the invention.

An embodiment of the system of the invention is shown in FIG. 1, in simplified schematic form. In a typical gas burner system there will be a requirement at start-up to purge the system, to ignite the pilot, ignite the main gas burner and run the system. Monitoring of the thermostat operation, air pressure and safety checks will also be required. The arrangement shown is capable of performing these operations. A number of inputs can be received by input interfaces 10. The thermostat switching can be input for monitoring as can the air pressure switch, and if desired an external interlock circuit (if one has been provided). A lockout reset input can also be provided via interface 11. These inputs will, when present, typically be at mains voltage so that interfaces 10 provide mains isolation but allow their status to be transferred as a low d.c. voltage to the address bus 14. A check on the burner flame is also provided by detector 12 which will convert the status to a suitable level for bus 14. The address but 14 is used to access data pre-stored within a memory device 18, in this example an erasable programmable read-only memory(EPROM). Addresses within the address area determined by the status of the various inputs can be incremented sequentially by the addresses provided on bus 15 which have been generated by oscillator 16 and address counter 17. This causes a sequence of instructions to be provided from the data outputs of EPROM 18. These instructions control, inter alia, the system outputs including ignition, pilot, and main burner relays, which form part of the output interface 23. Buffers within the interface will receive the data from bus 20 to drive the relays.

In addition to a basic operation and detection sequence, a variety of other safety checks are performed. The check counter 13 provides a count which is compared with the output of the address counter 17 and checked by the parity check block 22 and if an error is detected indicative of malfunction, the lockout relay 25 is actuated. Typically relay 25 will be a bistable device, resettable as shown by the lockout reset from input 11. In practice mechanical abuse may cause such a relay to fall out of one of these states. For safety the state into which the relay could fall is chosen as the lockout state. On lockout actuation, the fan, pilot, ignition and main burner relay contacts within output block 23 are removed from the mains supply by the switched lockout relay contacts. In addition an external lockout output power signal is available for use remote from the control system, e.g. actually at the burner or for alarm actuation. Power for this operation is available from supply 24. This supply can be made available for use with the thermostat and other remote items to allow suitable system inputs to be generated. As described below, the fan load relay is associated with a circuit which checks the continuity of the lockout relay (set) coil as a fail-safe so as to cause deactivation of the load relay should this lockout coil become open-circuit.

A relay contact interface circuit 27 is provided to allow the status of various relay contacts to be checked, so as to discover when, through wear, any have become welded together, which is not an uncommon problem with powerful relays. The relay check circuit 28 determines whether any error is present. A frequency check circuit 29 monitors the system oscillator output 16 with an internally generated frequency and if an error is detected, then a change in status occurs and this is output to the address bus 14, so that the EPROM address area is changed and suitable instructions stored therein are implemented to curtail operation. The relay check output from block 28 can modify the operation of frequency check circuit 29 so as to produce error detection conditions, as described below. Further failure conditions may also be determined. For example, the parity check circuit 22 may itself be subjected to test signals to determine that no circuit component has become inoperative during use, which may otherwise allow a parity error to go undetected. A display 19 is provided to indicate the status of the various system outputs and inputs. Some on the display inputs will come from the address bus 14 and some from the data bus 20. Where nine indicators are provided, as shown, these could display the status of thermostat, air, flame, interlock, fan, ignition, pilot, main valve and lockout.

As seen from the above description, a major component is the memory 18. Any programmable memory of sufficient data capacity can be used for this device, e.g. ROM or PROM although an EPROM has the advantage that it could be re-programmed to perform different sequential operations.

The configuration of the EPROM is shown in FIG. 2. It has been found that a 4096×8 bit EPROM (e.g. Texas type 2532) provides sufficient memory requirements. Access to the memory locations is provided by 12 address lines A0–A11. Thus any one of the storage addresses is accessible in dependence on the 12 bit word from buses 14 and 15. Each of the 4096 accessible addresses will allow its data content to be output as a 8 bit word from data outputs D0–D7 onto bus 20.

In effect the status of the inputs on lines A7–A11 define the areas of the EPROM accessed. The counter generated binary addresses A0–A6 will sequentially increment the addresses within the memory areas defined by the inputs on the other address lines. The 7 counter lines will allow a total of 128 address steps to be incremented. Interlock high on line A7 will alone cause the addresses to start from location 128; A8 (relay/frequency check) from location 256; A9 (flame) from location 512; A10 (APS) from location 1024; A11 (Stat) from location 2048. Hence a closed thermostat on its own will access address 2048, but if a flame is present the address will be 2560 (i.e. 2048+512). If the air pressure switch was also input as closed then the address would increase to 3584. APS and stat alone would define address 3072. These combinations defining an address would then be incremented in single address steps up to a total of 127 additional locations. In practice one or more of the inputs on A7–A11 may change status during a sequence so that the counter generated address need not be a zero when this occurs and so a higher address is accessed. As will be seen from the description below, when the external stat, APS, and interlock are closed then this causes a binary '1' which accesses the address line defined thereby. This also occurs with a detected flame. The relay/frequency check is normally '0' and changes to '1' when an error in relays or frequency occurs. In other words lower EPROM addresses are accessed during normal running. Thereafter addresses jump by 256 locations, when A8 changes status on error detection. The prestored 8 bit words within the EPROM will effectively control system operation. Hence the least significant bit D0 will control ignition when logically high. Similarily with D1 for pilot and D2 for main gas valve. D3 is used as a check in the parity check circuit.

D4 acts as a counter reset to return the system counter to zero, when this bit is logically high. D5 is used to actuate the 'load' relay for the fan (in practice via parity check and lockout set coil as described below).

D6 provides a 'hold' signal to maintain that point in the cycle which prevents further incrementing of the address counter so freezing sequencing of the system.

D7 is a check bit used in the parity checking circuit.

A more detailed explanation is now provided with respect of FIGS. 3A–3H which relate to a specific embodiment of the FIG. 1 and 2 configuration.

Figure 3A:
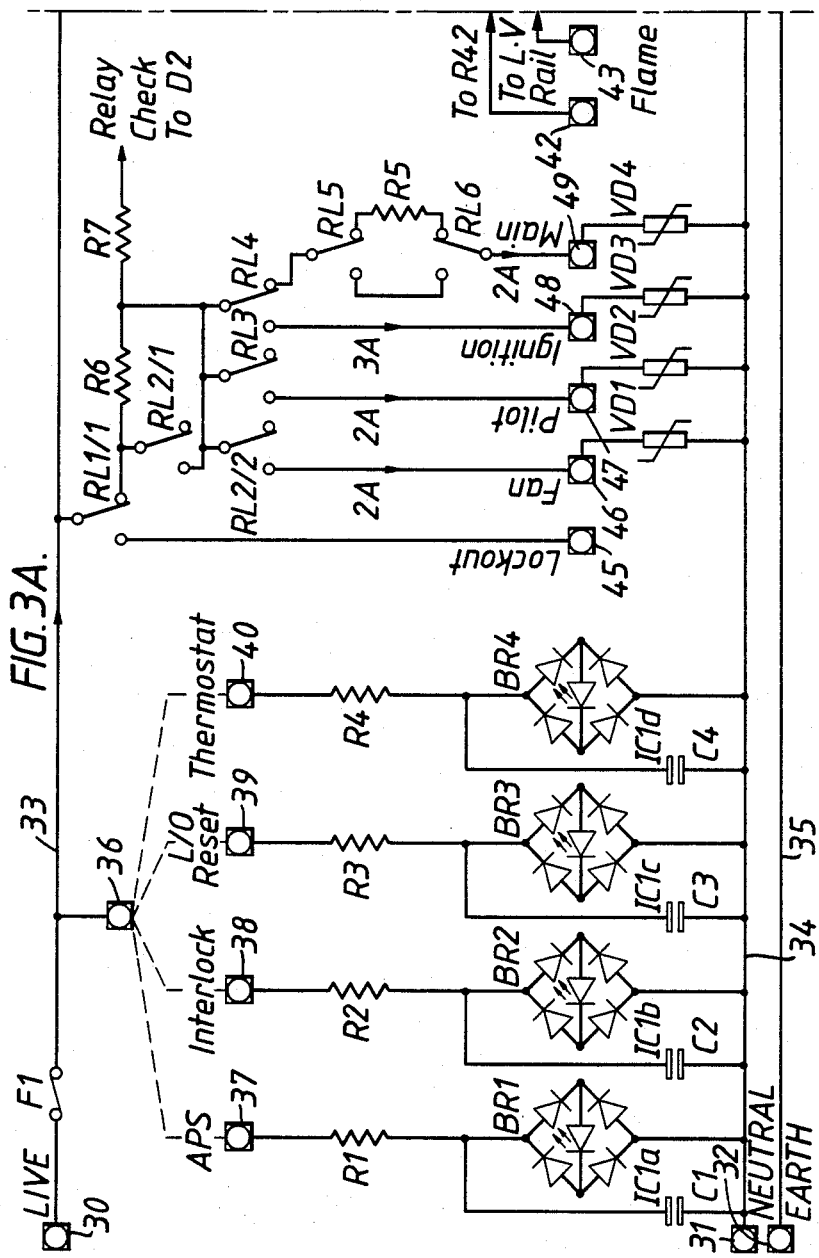

The burner system inputs and outputs are shown generally in FIG. 3a. Mains input to the control system is via sockets 30–32. The live rail 33 typically receives a 240 v 50 Hz input via fuse F1 with neutral on line 34 and earth on line 35. A socket 36 allows the mains voltage to be available for use with a variety of remote sensors. As shown schematically, sockets 37–40 will receive the rail voltage when the respective remote input is switched into a closed position. Thus when the air pressure switch is closed, the mains voltage at input socket 37 will cause the current limited by resistor R1 to be rectified by diode bridge BR1. Capacitor C1 suppresses transients. The resultant d.c. will power the light-emitting diode forming part of IC1a acting as input interface 10 of FIG. 1. A similar situation is achieved when the mains voltage is received at the socket 38 for the interlock with R2, BR2, C2 and IC1b being used. The lockout reset input to socket 39 will make use of R3, BR3, IC1c and C3. This was represented as interface 11 in FIG. 1. The thermostat, when closed will cause the live rail voltage to be applied to socket 40, causing IC1d diode to be illuminated via R4, BR4 and C4. IC1a–d is typically a 4 input standard opto-isolator, the light coupled outputs being shown in FIGS. 3B and 3F described later.

A flame detector input is provided at sockets 42 and 43. The input will typically be provided from the rectified output of an ultra-violet (uv) cell used as the flame sensor (e.g. Sylvania P578+diode) or by the rectification effect of a flame. The input passes to a sensor detection circuit described later with relation to FIG. 3G. The system outputs are provided at sockets 45–49, and can be considered as part of the circuits within the blocks 25 and 23 or FIG. 1.

Neutral and earth are available at socket 31 and 32 respectively. The lockout output at socket 45 is activated when lockout relay contact RL1/1 is in the opposite position to that shown in FIG. 3A. The fan output at socket 46 is activated when load relay contacts RL2/1 and 2 are in the opposite position to that shown, but with RL1/1 as shown, so as to provide a series connection from rail 33. Pilot output from socket 47 operates when pilot relay contact RL3 is the position opposite to that shown, forming a series connection with RL2/1 and RL1/1. The ignition output at socket 48 operates when ignition relay contact RL4 is in the position opposite to that shown to provide a series connection with RL2/1 and RL1/1. The main valve output at socket 49 will operate when flame relay contact RL5 and main relay contact RL6 are both in positions opposite to that illustrated to provide a series connection with RL4, RL2/1 and RL1/1. Thus for example, the main valve can only be energised if a flame is present. Resistors R5-R7 are of high resistance so currents are too small to actuate devices via this route. The positions and actuation of the various relay coils associated with the contacts are described later.

The voltage dependent resistors VD1-VD4 act as anti-surge devices.

Figure 3C:
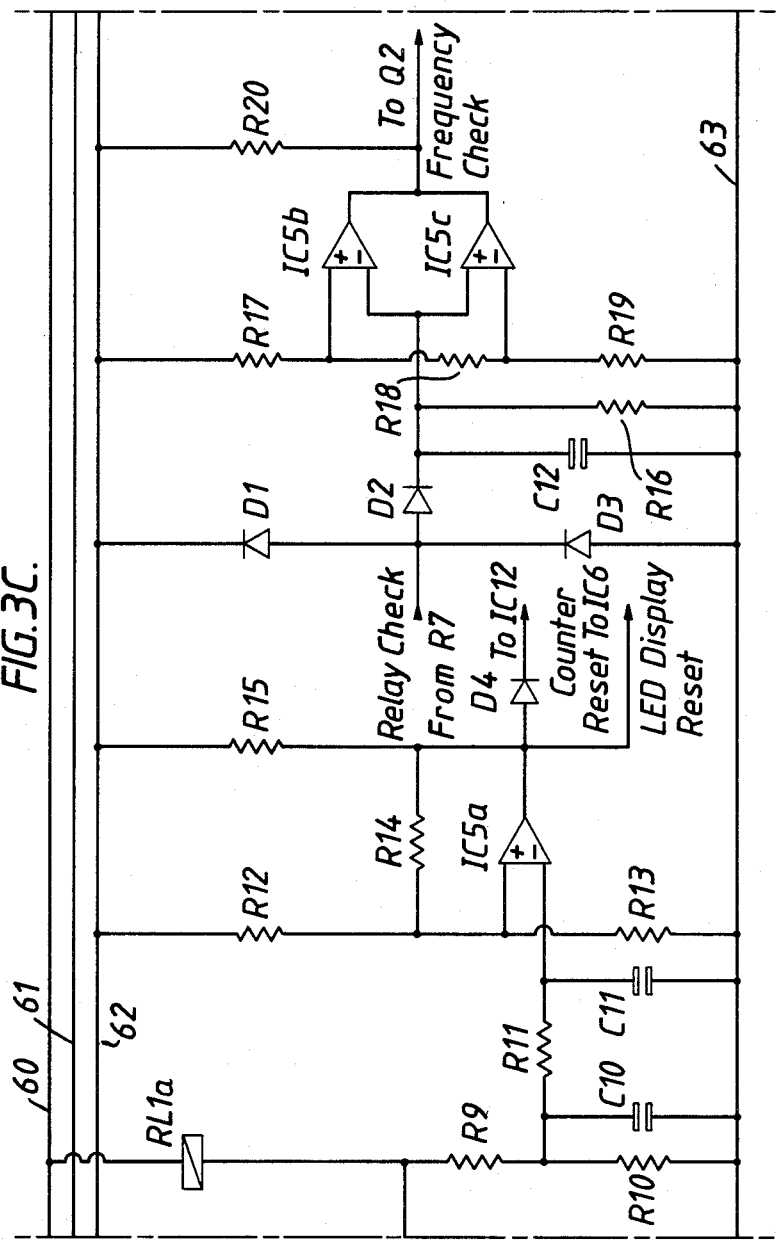

Resistors R5-R7 form the relay contact interface 27 of FIG. 1 for the relay contact safety check circuit to detect welded or open contacts and are described in more detail with regard to FIG. 3C, which receives the output of resistor R7.

The live rail 33 and neutral and earth 34, 35 pass to FIG. 3B and are used via isolation transformer TR1 to provide a source of low voltage a.c. which is rectified by diode bridge BR5 and smoothed by capacitors C5, C6. Precise regulation is provided by a standard 3 terminal voltage regulator IC2 to provide a 5 v output on rail 62 to power various circuit components including the EPROM and other IC's. The smoothed but unregulated rails 60 and 61 provide a 12 v output for relays and other components. An additional lockout relay contact RL1/2 will switch the output normally provided on rail 61 to drive a LED (LD9) shown in FIG. 3D, indicative of a lockout condition. To assist in 5 v regulation, capacitors C7, C8 are provided between rails 62 and common rail 63. The phototransistor forms part of the optocoupler.

IC1c of FIG. 3A is driven via bridge BR3 and connects to the 5 v rail via resistor R8 and capacitor C9. When a lockout reset input is present as described in FIG. 3A, the transistor will conduct causing the input of inverter IC3a to go low and its output to go high. This inverter (e.g. 40106) has inbuilt hysteresis so it also acts as a risetime improver or noise eliminator. The high output is inverted by driver IC4a to provide a logically low output. This output, see FIG. 3C causes the 'reset' coil (a) of the lockout relay RL1 to be actuated. This relay has two coils and operates as a bistable device, the 'set' coil RL1(b) being shown on FIG. 3E. Contact RL1/2 associated with the reset coil is shown in the non 'lockout' or reset mode in FIG. 3B. As the lockout 'reset' may be a push-button on the boiler, or any other gas burning plant which is momentarily operated manually, the 'reset' input will not be maintained, but due to the bistable nature of the relay, this is not a problem as the relay holds this state. The temporarily low output of IC4a during 'reset' will also be available via voltage divider resistors R9, R10 and capacitors C10, C11 and resistor R11 to one input of a comparator IC5a (e.g. LM 339). A stable reference voltage from resistor network R12-R15 provides voltage comparison and causes the comparator to provide a reset output (5 v) via diode D4 whenever the lockout is reset. This reset output is used to reset several devices described below including the counter IC12 of FIG. 3H and the display driver IC6 of FIG. 3D. To prevent unreliable operation due to mains supply problems, IC5a will also initiate a reset if the 12 v rail 60 begins to fall lowering the voltage across relay RL1a. This fall from the rail 60 will be more pronounced than a fall on the 5 v regulated rail 62 from which all the integrated circuit chips are powered in normal manner. Thus this part of the circuit performs several functions. It detects for low supply voltage or a lockout reset signal, resetting the counter and display. Continual powering of the lockout reset (an error condition) will hold the circuit reset, so no operations can proceed.

The relay contact check referred to as block 28 in FIG. 1 is effected by comparators IC5b,c. A reference voltage is provided for each comparator by resistors R17-R19. The input to be compared passes via a circuit comprised of diodes D1-D3, capacitor C12 and resistor R16.

The resistors R5, R6, and R7 (of FIG. 3A) together with R16 form voltage dividers which reduce the mains voltage to a few volts. Earth rail 35 acts as circuit return connected to common rail 63 (see FIG. 3B). Diode D2 rectifies this a.c. signal and capacitor C12 smooths it. This voltage is then compared with the upper and lower limit set by R17-19 using the comparators IC5b,c (e.g. LM 339).

From FIG. 3A it is seen that all mains current for driving the outputs passes first through the lockout relay contacts RL1, then through the load (fan) contacts RL2. The lockout contacts will be in the position shown in FIG. 3A unless lockout occurs; and if this happens all other outputs are disconnected. As regards RL2, the fan will operate when the contacts move to the opposite position to that shown in the Figure, and relay contacts RL3 and RL4 will also receive power when RL2 contacts move to this position (i.e. with the fan operating). The pilot will be powered up when contacts RL3 are in the position opposite to that illustrated, as will ignition when RL4 is in the opposite position to that shown. The main gas valve will be actuated when contacts RL6 (main relay) and contacts RL5 (flame relay) are in the opposite positions to those shown as will RL4 as shown (i.e. ignition off). Because of the presence of resistor R5, the main valve will not operate when the contacts are in the position shown, as the available current will be too small. If resistors R5 and R6 are each 2.2 M$\Omega$ in value, the current provided to the main gas valve will be only 55 $\mu$A. R6 and R5 acting as a potential divider will provide about half the supply voltage (120 v for 240 v supply) when the control is in the shutdown state. When the pilot gas valve is connected (i.e. relay contact RL3 is in the opposite position to that shown), then there is a short circuit route for this current and hence the voltage provided to R7 falls to 0. Similarily if relay contacts RL5 or RL6 alone are in the incorrect state then this voltage will rise to 240 v. If relay contacts RL2/2, RL3 or RL4 are in the wrong state, then resistor R5 is bypassed and the output voltage falls to zero. Finally, if relay contact RL2/1 is closed the resistor R6 is bypassed and the output voltage will again rise to 240 v.

If the voltage supplied to resistor R7 is thus around 120 v all of the relay contacts are in the correct state for the shutdown situation as shown in FIG. 3A. If the voltage is around 240 v then a fault has occurred in relay contact RL2/1, RL5 or RL6, and if the voltage is near zero then either relay contact RL3, RL4 or contact RL2/2 is at fault. This system therefore provides an efficient way of detecting relay faults by monitoring their status using resistor combinations in the shutdown situation so that erroneously open circuit contacts or welded (closed) contacts are detected. The voltage at the R5/R6 junction is reduced by R7 (IOM$\Omega$) and R16 (390K$\Omega$) to a few volts, rectified by diode D2 and smoothed by capacitor C12. The reference voltages set by R17-19 are typically 1.5 v and 2.5 v. With the control at shutdown, the relay check circuit should give approximately 2 v and the output from the window comparator should be 'low', if the contacts are correctly positioned, and 'high' if a relay contact is an incorrect state. The relay check circuit is not itself fail-safe, and therefore needs to be checked on start up. One way to perform this check is as follows. On commencing the start up sequence, the output from the comparators is checked for a high state. Having completed this check, one style of fault is simulated and is achieved by powering the pilot output relay RL3. Since the load relay is not powered and the first stage of the check will have proven this to be the case, the pilot relay can be operated without fear of energising the pilot output. This will have the effect of reducing the voltage on resistor R7 to zero causing the output from the comparators to go 'low'. A short delay may be required whilst C12 discharges, and then the new state of the comparators can be checked.

The pilot relay RL3 is then de-energised, and after a short delay the comparators are against checked to conform that RL3 has indeed opened. The final stage of the checks is to power relay RL2 (commencing the purge) hence simulating the second style of fault and then testing for a high voltage on R7 and a corresponding flow output from the comparators. This correctly completed sequence allows start up proper to commence. Any incorrect check will cause the comparator output via the frequency check circuit to give the incorrect A8 status so accessing a different area of the EPROM which will contain data which when output will cause lockout to be effected.

As just stated a fault condition of the relay contacts will cause the voltage applied to the comparators to result in a change of state at the comparators. This 'high' state tied via pull up resistor R20 to the rail 62 passes as an error signal to transistor Q2 of the frequency check circuit (see FIG. 3G) which can be considered as block 29 of FIG. 1. This transistor affects the operation of IC10 which is also part of the frequency check circuit. This integrated circuit is a phase locked loop (PLL) device (e.g. NE 567) which will track an external frequency signal with reference to an internally generated frequency. The control for this internal frequency is provided by preset resistor VR1, resistor R46 and capacitor C25 which sets the PLL centre frequency (e.g. 2 KHz).

The external frequency (see also FIG. 3H) is provided by the system oscillator IC11 (e.g. type 4060) which can be considered as block 16 of FIG. 1. This signal is received via capacitor C30. The PLL filter inputs are connected to C26 and C27. The PLL output is provided as address line A8. This is tied to rail 62 via resistor R47, and will be logically low when the frequency is tracked as accurate (i.e. within 5%). If the loop falls out of lock this means that the input frequency or the PLL has become incorrect or when testing the relay contacts, the comparators have detected an error causing Q2 to conduct and C24 to be included in the centre frequency setting of the PLL so causing an error signal as defined by a logically high signal on A8. So at start up, the relay contacts, the PLL and the oscillator are all checked in one test. The system oscillator frequency is highly stable as set by the network including the crystal CR1, resistors R48, 49 and capacitors C28, C29, CR1 may be a standard 32.768 KHz device.

The IC11 device includes an internal 14 stage binary ripple counter so that the basic oscillator set by the network can be obtained in binary divided frequencies from the various outputs. Thus the clock pulses from the output Q10 are a $2^{10}$ division of the basic frequency. The basic oscillator frequency (32.768 KHz) results in an output from Q10 of 32 Hz which after further division provides the basic EPROM timing. The input to the PLL is from output Q4 which is a $2^4$ division of the basic frequency (i.e. 2.048 KHz). The Q6 output provides a 512 Hz signal to be input to IC14d. The Q7 output (256 Hz) is used as a strobe for the display. These functions are discussed in more detail later.

Figure 3D:
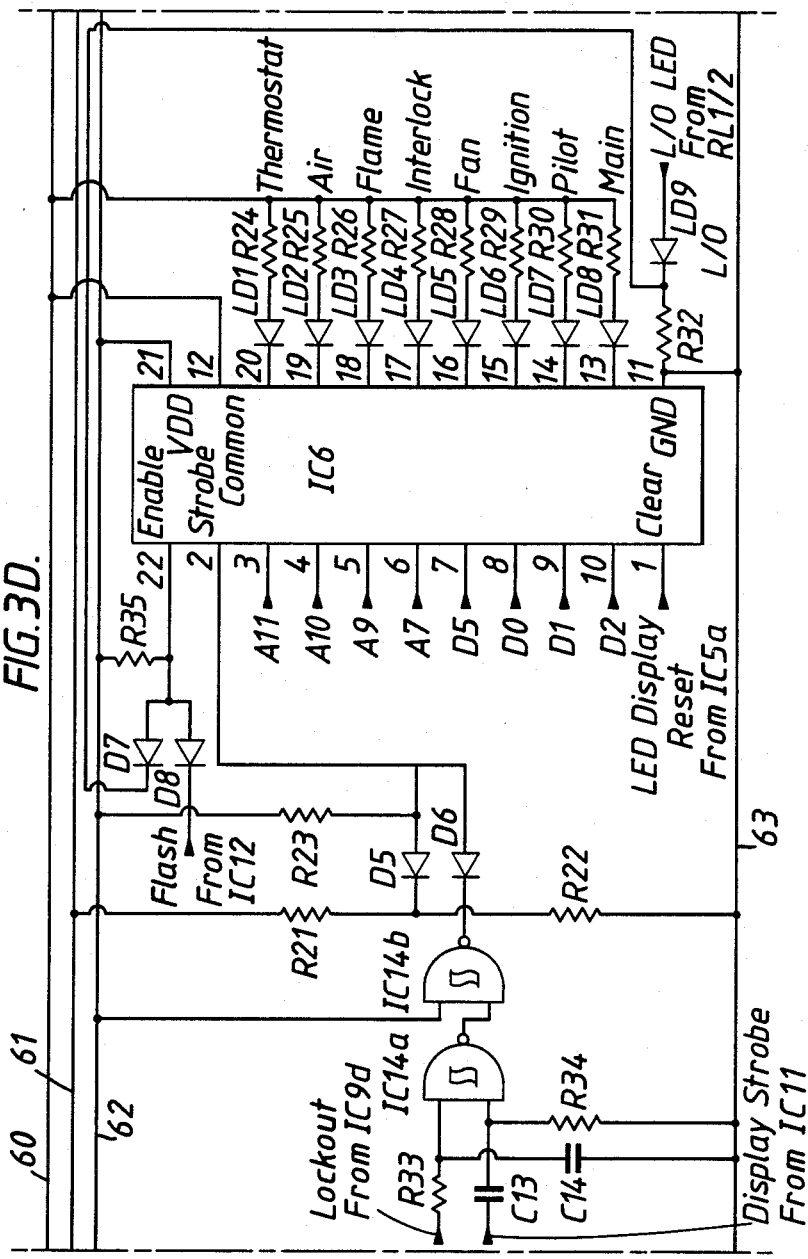
Figure 3G:
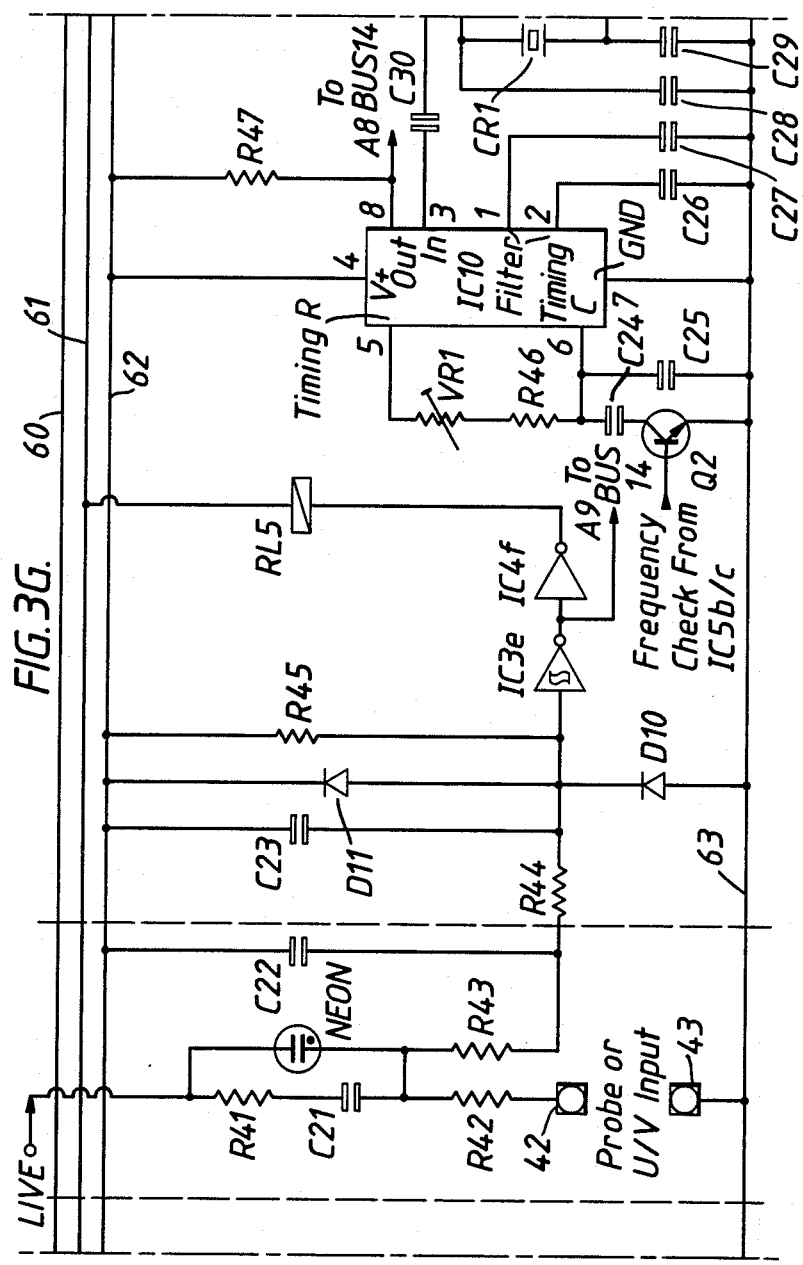

Whereas the A8 for the EPROM is provided by the output of IC10 in FIG. 3G, the address A9 is provided by the output of IC3e of FIG. 3G, which together with its associated circuit components form the detector block 12 of FIG. 1. As already shown on FIG. 3A, sockets 42 and 43 provide the rectified input from a standard ultra-violet flame sensor at the burner or for a flame rectification probe. Resistor R41 and capacitor C21 apply a current limited mains supply to the flame sensor, the capacitor blocking d.c. The rectified U.V. cell output or the flame rectification current causes a d.c. current to flow. The only path for this d.c. is from the path provided by resistors R43, R44, R45. A current of very small magnitude (typically 1 $\mu$A) will produce a small voltage across R45 (typically 2.7 v), which is detected by inverter IC3e causing this to produce a logically high output. Capacitors C22 and C23 filter out a.c. ripple and diodes D10 and D11 prevent transient voltages from damaging IC3e.

D10 also prevents the voltage on resistor R45 and capacitor C23 from going too negative so that in excess of 2 $\mu$a the response of the detector remains constant. The neon prevents very high ignition voltages which may breakdown to the flame rectification probe from damaging the circuit. The device IC3e has inbuilt hysteresis to provide a positive switching action with noise elimination. While the logically high output from IC3e is indicative of flame presence, the inverter IC4f makes this output a logically low output so causing a current to flow from rail 61 so as to actuate the flame relay RL5, its switching contacts already being described with regard to FIG. 3A.

The remaining inputs for address lines A7, A10, A11 for system control via the EPROM, as already discussed with regard to FIGS. 1 and 2, are shown in FIG. 3F. These inputs can be considered as part of block 10 of FIG. 1. Devices IC1a, b and d are the photoreceiver portions of the optoisolators driven via bridges BR1, Br2 and BR4 already described in FIG. 3A, viz APS, interlock and thermostat, The conducting phototransistor IC1d will pulldown the voltage at the input to inverter IC3b produced by resistor R38 and capacitor C18 when the remote thermostat switch is closed, thus producing a logically high output at address line A11. Device IC3b (e.g. 40106) has inbuilt hysteris to aid switching. Phototransistor IC1a with resistor R39 and capacitor C19 will cause inverter IC3c to produce a logically high output at address line A10 when the remote air pressure switch is closed.

Phototransistor IC1b with resistor R40 and capacitor C20 cause inverter IC3d to produce a logically high output at address line A7 when the remote interlock switch is closed. For normal system operation the remote interlock switch will not be closed, so a logically low signal will be the norm on line A7. These address lines together with lines A8 and A9 just discussed are part of the address bus 14 shown in FIG. 2. The data output lines D0-D2 on EPROM data bus 20 are also shown in FIG. 3F.

The driver buffers IC4c, d and e are connected to the 12 v rail 61 to allow power for driving relays RL4, RL3 and RL6 associated with ignition, pilot and main operation as described above with relation to FIG. 3A with regard to contact operation. These relays can be considered as part of block 23 of FIG. 1.

Figure 3H:
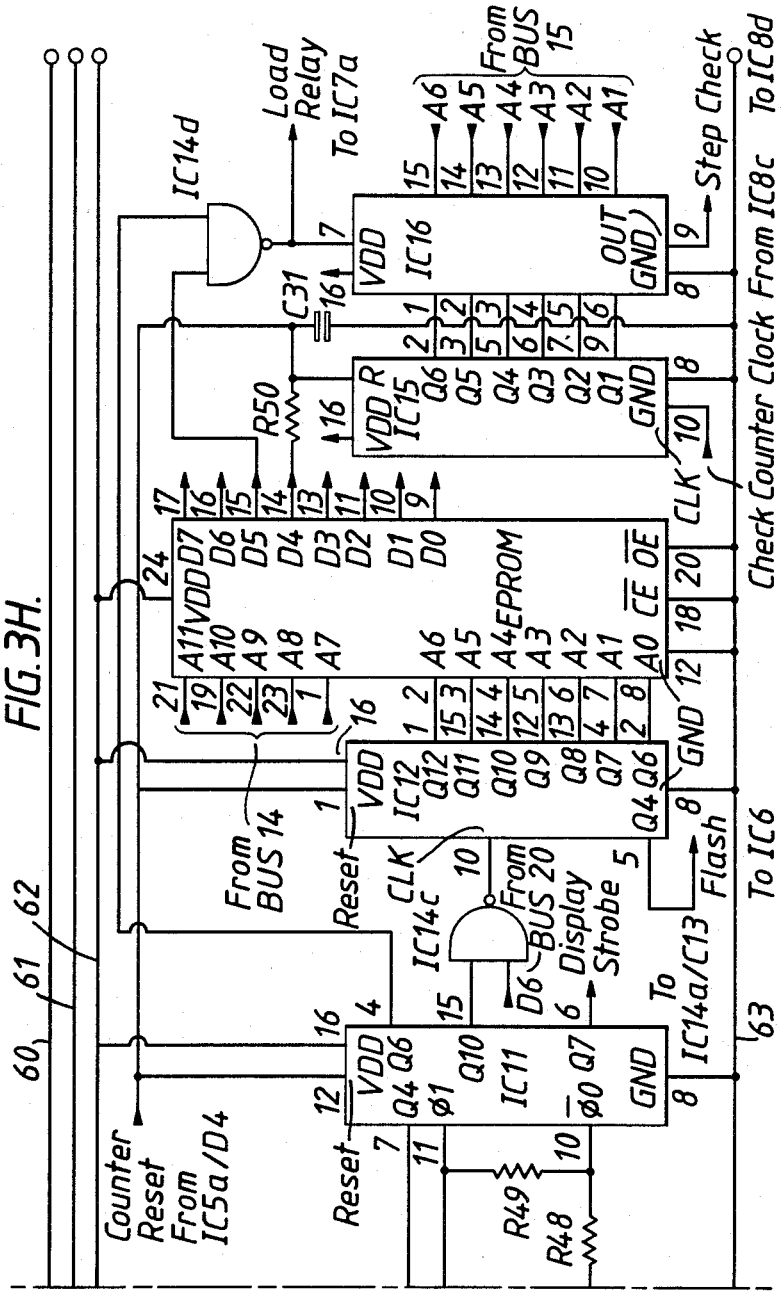

Referring now to FIG. 3H, the D0-D2 data outputs used to control the above relays are shown coming from EPROM 18. The data line D3 on bus 20 is provided as a check bit as is output D7 and this is described in more detail below when considering the parity check circuit. Data output D4 is a reset bit which resets the check counter IC15 (e.g. type 4040) via resistor R50 and capacitor C31. It is to be noted that counters IC11 and IC15 can also be reset by the actuation of the lockout reset circuit, described above with relation to FIG. 3C.

D5 is the data bit controlling the load (fan) relay after passage through a check circuit described later. As far as FIG. 3H is concerned it can be seen that the signal for operating the load relay available on D5 is passed to NAND gate IC14d (e.g. 4093). The other NAND input is from the Q6 output of oscillator IC11, so that the NAND output will be a relatively high frequency signal compared to the clock Q10 from the oscillator. This higher frequency is typically 512 Hz. In practice when the 5D output is low, this high frequency signal cannot pass to the output of NAND IC14d. If D5 is high, indicative of load relay actuation, then the NAND output will be at the same frequency but inverted due to the continuous presence of the D5 output. The NAND output is also provided as one input to the parity check device IC16 (e.g. 4531), and can be considered as part of the block 22 of FIG. 1. As shown, other inputs to the counter parity check circuit are provided by the system counter IC12 outputs A1-A6 on address bus 15 and the outputs Q1 to Q6 of check counter IC15 (e.g. 4040) equivalent to block 13 of FIG. 1. This binary ripple counter IC15 is clocked by the output of the parity check circuit of FIG. 3E described later. The parity check device IC16 produces an output which may be either high or low depending on the parity of the combination of the inputs (i.e. whether there are an even or odd number of inputs logically high or low) so could check for example if the control sequence started erroneously part way through its normal operations sequence due to the failure of an output from IC12 or any sequencing fault occuring during operation. The output of the counter parity check is used in the FIG. 3E check circuit.

The D6 data output from the EPROM is used as a 'hold' signal, when logically high, for the counter IC12. This is achieved by passing it to the IC14c (e.g. 4093) which is a NAND gate. This causes the address counter to be held at the given address so the counter does not increment, nor does the operating sequence, whilst a 'hold' is present. This does not prevent a change in the A7 to A11 inputs being applied to the EPROM. The IC12 counter (e.g. 4040) is also a binary ripple counter, the outputs being taken from the Q6-Q12 outputs. The internal frequency dividers reduce the 32 Hz input from IC14c to a basic 0.5 Hz rate to the EPROm. Thus the counter output will remain 'high' for one second and low for one second before incrementing. The Q4 output (2 Hz) is available for use with the display to indicate a fault condition under the control of the lockout circuit, described in more detail below.

The EPROM data output D7 is used as a check bit in the parity check circuit now described with reference to FIG. 3E and this circuit can be considered as corresponding to a further part of block 22 of FIG. 1. This circuit includes a series of EXCLUSIVE—OR devices IC7a-d, IC8a-d and IC9a-d. The counter address output A0 for parity checking from bus 15 passes to one input of gate IC9a (A1-A6 as described above were received by check circuit IC16 in FIG. 3H). All data bits D0-D7 from bus 20 are received by the gate inputs as shown in FIG. 3E. Also the 512 Hz signal to actuate the load relay derived from EPROM line D5 and the NAND IC14d is received at the other input to IC7a. The step check output from parity IC16 of FIG. 3H is received as one input to IC8d. Under normal operational conditions, the data inputs changing at normal system clock rates will allow a check counter clock at half the speed of that at counter IC12 to be available from the output of IC8c at its junction with capacitor C15 (e.g. 470 pF) this capacitor preventing errors, due to the settling time after change of status on any EPROM output, from clocking counter IC15. One of the inputs to gate IC9b is taken from the junction of resistors R36 and capacitor C16, ultimately controlled by the output of gate IC9a. The EX—OR devices will provide a logically high signal when either input but not both are high, so under any other combination of conditions their output will be logically low. The parity check circuit is designed to check the overall parity of the EPROM data outputs, the address counter outputs, the check counter outputs and the check circuit integrity. In normal operation the check counter outputs and address counter outputs are identical so there will be parity. The output of the parity check device IC16 reflects this parity. In practice, due to the high frequency input (512 Hz) this device output will provide an output changing state at the same rate as the output from NAND IC14d of FIG. 3H. If the counters IC12 and IC15 agree then the step check output IC16 will be in phase with the output from IC14d. This output from IC16 is used as a step check in the EX—OR circuit of FIG. 3E. Although address parity is odd, the EPROM will have to be programmed such that the data outputs (including the check bits) of the 8 bit word in those areas of the EPROM not associated with system lockout will always have a combination of logically high outputs that are of an odd parity (i.e. 1,3,5 or 7 bits). The parity check circuit would then detect an odd parity. The load relay input to IC7a and the step check input to IC8d act as a relatively high frequency test signal to test the curcuit, whenever the load relay is energised.

The signals will normally be identical in status and frequency. However, due to the presence of R36 and C16 a slight delay is introduced to the step check input. Typically a delay of 50 μSec is introduced so that during this short period at millisecond intervals (the period of the high frequency signal) an overall even parity is introduced.

IC9c output will therefore be logically high so the lockout relay set coil RL1b will not be actuated via inverting buffer/driver IC4b. Each time the load relay clock changes state this check is made. It is to be noted that the output data lines D0 to D3 are preprogrammed so that their combined parity always follow the status of address line A0 to maintain correct overall parity.

If the address parity of the counters is wrong due to their being out of step then the step check input will have been inverted. If there is a fault in the EPROM data then parity will be incorrect on the data inputs. The route of the two signals at IC7a and IC8d will test each gate and thus exercise each part of the circuit. If there is a fault in any of the EX—OR gates then data will be corrupted and parity will be incorrect causing the IC9c output to be low, under any of these circumstances (i.e. counter, EPROM or check circuit error). When IC9c goes low then the lockout coil RL1(b) is energised. This relay coil can be considered part of block 25 of FIG. 1. A signal from the output of IC9d is available under lockout conditions to be used by the system display as described below. Although the 50 $\mu$Sec pulses are too short to actuate the lockout set relay RL1(b) under normal operating conditions, as the mean current is very small, nevertheless this small current will be available if the load relay input to IC7a is present in the correct status (determined by EPROM output D5 via IC14d of FIG. 3H). This small current is received by detector Q1 (see FIG. 3F). The detector is a high gain transistor (e.g. darlington TIP127) which produces larger current pulses to the diode pump circuit comprising resistor R37, capacitor C17 and diode D9. While the input pulses are received the transistor pulses are sufficiently large to charge the diode pump circuit so that load (fan) relay RL2 is energised and remains so. This arrangement acts as a safety check for the continuity of lockout set relay coil RL1(b). If this coil became open circuit and incapable of actuating, then the small input current pulses would cease and de-energise the load relay so acting as a fail-safe device. In other words the lockout relay coil is checked and the load relay is normally energised by the same signal, even though this is a series of very short duration pulses. As a further safeguard R37 ($\frac{1}{4}$ watt, 100 $\Omega$) will normally dissipate about 25 mW when the load relay RL2 is actuated. During lockout, this increases to over 2 watts, during a brief period. However, if this lockout relay fails to operate, R37 will continuously dissipate this high power and eventually fail providing a fail-safe breakdown. When a lockout is instigated during normal operating conditions, such as if the flame detector indicates flame failure at address line A9, then a lockout portion of the EPROM is accessed. The data stored at that address will have been chosen to have even parity (e.g. all zeros). This will cause all outputs to be de-energised. In addition even parity will cause the parity check circuit of FIG. 3E to initiate lockout by energising relay RL1(b). Under either condition lockout contacts RL1/1 of FIG 3A will switch off power available to the fan, pilot, ignition and main relays. Contact RL$\frac{1}{2}$ of FIG. 3B will switch the 12 v supply from line 16 to the lockout LED, LD9 of FIG. 3D. The drive of lockout relay RL1b is not continuous but is normally 'on' with short 'off' pulses at each transition of the test signal, but this is not detected by the transistor and hence will not charge the diode pump circuit so the load relay de-energises even if the lockout coil failed to actuate so as to provide a back up safe shutdown route.

The display configuration of FIG. 3D can be considered an corresponding to block 19 of FIG. 1. As just mentioned, at lockout, the diode LD9 is illuminated, which is current limited via resistor R32. The remaining display diodes LD1-LD8 are driven by display driver device IC6 (e.g. UCN4801A) via associated limiting resistors R24-R31. These diodes conduct when a logically high input is provided from respective address lines A11-A9, A7 from bus 14 and respective data lines D5, D0-D2 from bus 20. Input control is also provided by resistor R33 and capacitor C14 associated with one input of NAND gate IC14a and capacitor C13 and resistor R34 associated with its other input. This NAND is series connected with a further NAND IC14b (e.g. both Schmitt type 4093) its other input going to the positive rail 62. Two diodes D5, D6 are respectively connected to divider resistors R21, R22 and R23 and the output of NAND IC14b. The diode anodes are connected to the strobe input of the display driver. A further pair of diodes D7, D8 are connected together with resistor R35 to the enabling input of the display driver. The cathode of D7 is connected to LD9 and L/0 diode and the cathode of D8 receives the 'flash' input from address counter IC12 of FIG. 3H. Display reset is provided to the 'clear' input of the driver which is provided by the output of IC5a of FIG. 3c, operable when external L/0 reset is actuated. The input to R33 of IC14A is provided by the lockout signal from EX—OR IC9d of FIG. 3E.

The input of C13 of IC14a is provided by the Q7 oscillator output of IC11 of FIG. 3H acting as a display strobe.

The strobe causes the various input states of the thermostat (A11), APS (A10), flame (A9) and interlock (A7) and those of the fan load (DE5), ignition (D0), pilot (D1) and main valve (D2) to be latched and displayed by the driver. This strobe updates the display once every millisecond. On receipt of a lockout signal the strobe signal is prevented by the NAND gates from updating the driver and the display retains the status it held immediately prior to lockout. However the lockout diode LD9 is illuminated via the lockout relay whilst the remaining diodes LD1-LD8 previously illuminated will flash at the rate set by the income frequency to diode D8 from the system oscillator IC11. This display flashing will contine till reset is achieved by the external lockout reset.

Figure 4B:
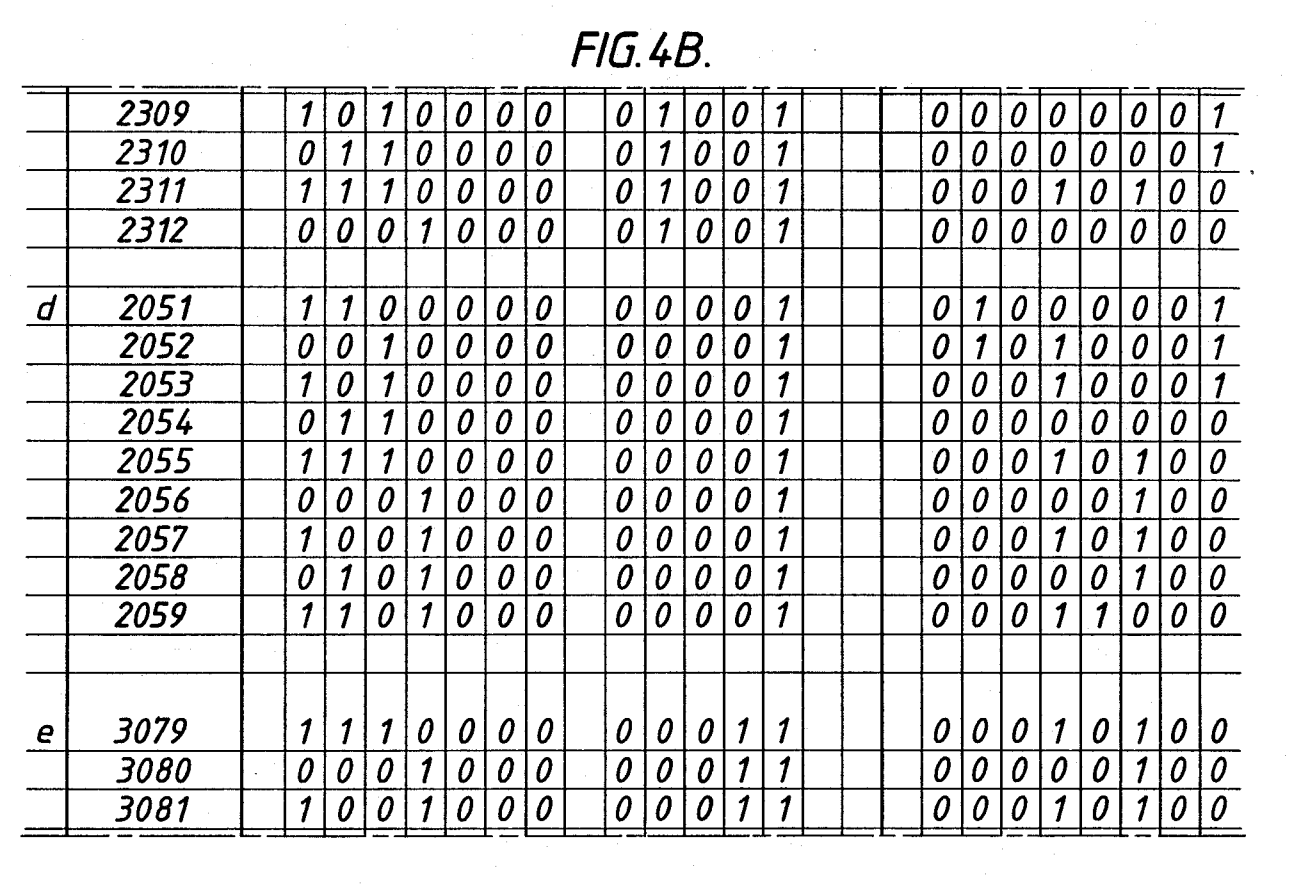
Figure 4C:
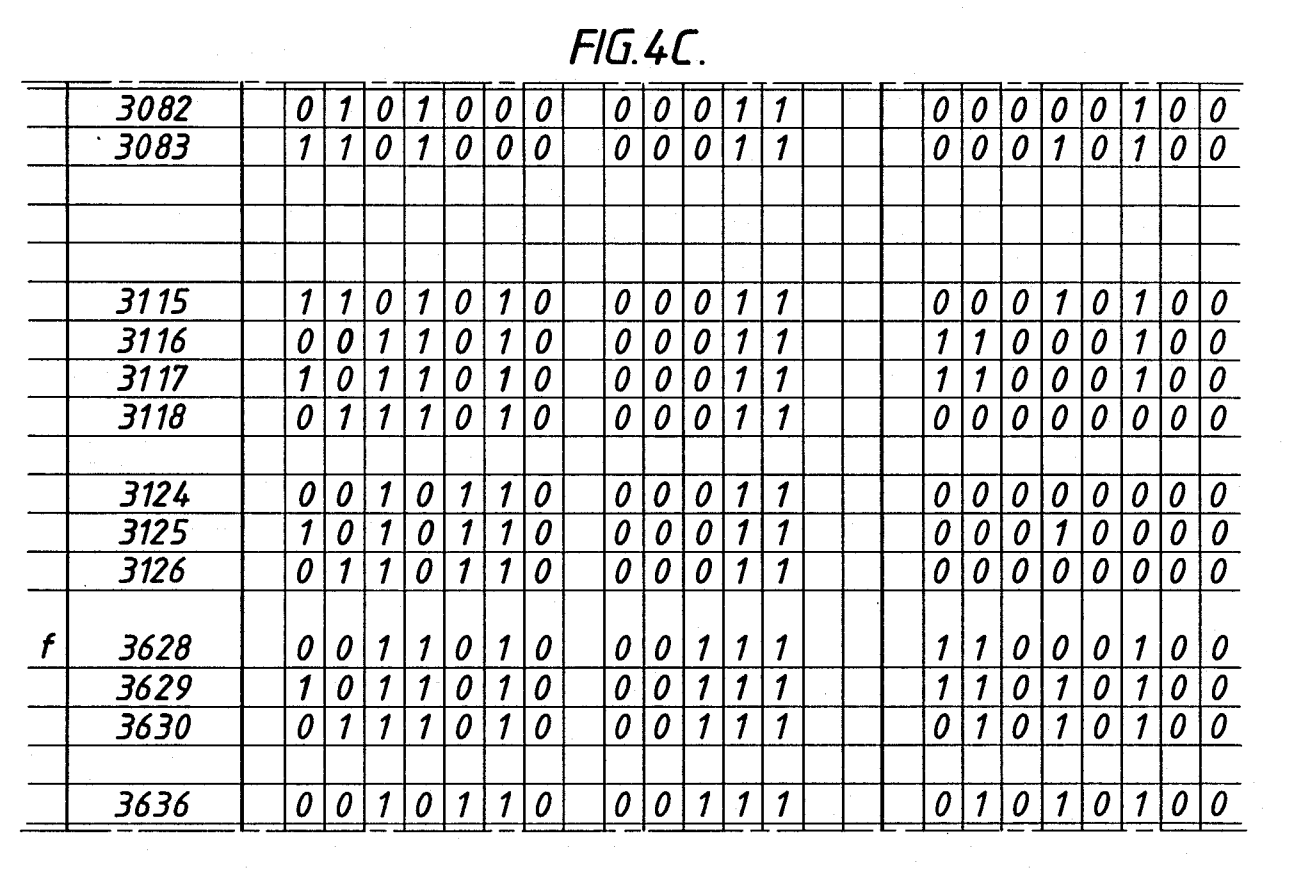

It is clear from the system described in FIG. 3 that a sophisticated control and safety checking configuration has been provided. As already described with regard to FIG. 2 and FIG. 3, the sequence of events produced at the EPROM output will be determined by the EPROM inputs and other factors to produce a comprehensive operating system. To illustrate an example of an entire operational sequence, a typical EPROM addressing and data output sequence will now be given with reference to FIG. 4.

At powering up of the system or following lockout—reset, and for the moment assuming the thermostat was open (i.e. burner not required) then the inputs A7 (interlock); A9 (flame), A10 (APS) and A11 (stat) will all be low to the EPROM inputs so the first address (zero) in the EPROM will be addresses due to the signal on line A0, following reset of counter IC12. The 8 bit word pre-stored in this location is shown in (a) of FIG. 4 and this is output to the data bus D0-D7. D7 is the only active bit and maintains odd parity. After one second the counter IC12 advances, and D4 becomes active and this causes the counter IC12 to be reset, so no further addresses are accessed. This reset will therefore occur at one second intervals, each time the counter is clocked. Odd parity on the data lines ensures that lockout is not instigated.

When the thermostat is closed (as would be the normal start up condition) then the A11 input will cause the EPROM address to jump to that shown in (b). Thus the stored data has only D7 high, to give odd parity. If the relay contacts were in the correct start-up state then A8 would also be high causing the EPROM address to be 256 locations higher at (c) (i.e. 2304). After counter IC12 changes state the next EPROM address (i.e. 2305) will be accessed. This does not contain a reset instruction (i.e. D4 is low) and hence the counter IC12 is allowed to continue. After a further 1 second the next EPROM address (2306) is accessed, providing the relays are in the correct state and A8 is high. If a relay contact had been welded closed for example then A8 would have been low causing the EPROM address to have been 256 locations lower (i.e. 2050) at which address all 'lows' are stored for D0 to D7. Such even parity will cause lockout to occur.

Assuming the correct addressing at (c) is achieved then the next address stepped after one second has D1 active so that the pilot relay is now actuated to check that its contacts close (2307). Closure of contacts will cause A8 to go low (an error is simulated) so the address will jump to 2051 as at (d). This location also has D1 high, maintaining the pilot relay energised, and D7 high preventing lockout. After a further one second counter IC12 advances again so that EPROM address 2052 is accessed. If A8 had remained high because the fault had not been detected the EPROM address 2308 would be used. This again has D0 to D7 stored all low, even parity causing lockout. Assuming the correct addressing at (d) is achieved then the next address stepped after one second will be at 2053, which has D1 low so that the pilot relay is de-energised. Opening of the RL3 contacts should cause A8 to go high (the normal shut down state) so the address will jump to 2309. This location also has D1 low, and D7 high preventing lockout. When counter IC12 steps on again EPROM address 2310 is accessed, unless a fault has occured. A fault would maintain A8 low, causing EPROM address 2054 to be used. This has D0 to D7 stored all low, causing lockout.

The final stage of the start-up check sequence occurs when counter IC12 steps on again accessing EPROM address 2311, with D5 high, which operates the load (fan) relay to simulate a further relay fault. The A8 line should now go low causing EPROM address 2055 to be accessed which also has D5 high. When counter IC12 moves on one count then 2056 will be addressed if A8 is still in the correct 'low' state. If A8 is high then 2312 will be addressed and lockout will occur.

Since the fan is energised the air pressure switch should now change state causing the address to increase by 1024 to 3080. After a few seconds the counter IC12 will have incremented this to 3083. If air now fails to be proven the EPROM address will revert back to 2059 where D4 is high causing a reset and hence a shutdown. The steps from 3080 to 3083 allow sufficient time for the air pressure switch to change state. This status is maintained for the next 32 steps of IC12, ensuring a 32 second purge. When the address reaches 3116 D0 and D1 both become high causing a jump to (f) 3628 (3116 and 512) which has identical data. After 2 seconds 3630 is reached, where D0 is low causing the ignition and output to be de-energised if flame is not present, A9 will be low and 3118 will be addressed causing lockout. After a further 6 seconds address 3636 will be reached, the last step before energising the main at 3637 by making D2 high. Again should the flame fail, A9 will go low, 3125 will be addressed and lockout will occur. Step 3638 maintains D2 high for a second second, until at 3639 D1 goes low extinguishing the pilot.

Finally, one second later, 3640 is addressed with D6 high causing the system clock to hold.

If flame should dissappear A9 will go low and EPROM address (3640−512) 3128 will be accessed causing lockout.

If air should fail A10 will go low and EPROM address (3640-1024) 2616 will be accessed causing a reset and hence a shutdown.

If the thermostat opens, A11 will go low and EPROM address (3640-2048) 1592 will be accessed again causing a reset and hence shutdown.

We claim:

1. A burner control system for controlling a burner system having a number of operable devices, said control system comprising:
   input means for receiving a plurality of inputs indicative of the status of a plurality of the burner system devices;
   output means for providing a plurality of outputs for controlling burner operations;
   control memory means for effecting a sequence of control events for the output means to control burner operation, said memory means being configured to allow the sequence therefrom to be modified in dependence on the inputs received at the input means and wherein the input means are connected to an address bus of the memory means to modify a memory area comprising a plurality of storage locations and accessed dependent on the state of the inputs, an address sequencer being also connected to the address bus to sequentially address locations within the memory area defined by the input means, and the output means are connected to a data bus of the memory means, said memory locations being preprogrammable with control data and accessible by the input means via the address bus to provide the control sequence for the output means to initiate and maintain burner operations, said control memory including means connected to the data bus for effecting shutdown of burner operation in response to incorrect status of at least one of said inputs and said control memory means including means connected to the data bus for effecting initiation of burner operation in response to correct status of said inputs during a start-up sequence, and further comprising feedback means connected between the data bus and the sequencer means configured to hold further sequencing dependent on preprogrammable data within a selected memory location to maintain burner operation until a change of status is effected at an input.

2. A system as claimed in claim 1, wherein the memory means comprises a read only memory preprogrammable at least once.

3. A system as claimed in claim 1 or claim 2 wherein the address bus of the memory comprises a number of address lines, wherein the memory locations of said memory are accessible by defining their addresses as binary words, wherein each of said binary words are comprised of a number of bits each for one of said lines, the more significant bits being associated with the input means and the less significant bits being associated with the address sequencer means.

4. A system as claimed in claim 3, wherein the input means include buffers for converting the inputs to a level suitable for the address bus.

5. A system as claimed in claim 4 wherein the input means include opto-isolators for transforming high voltage levels to low level d.c. voltages.

6. A system as claimed in claim 3, wherein the input means include thermostat and air status input means.

7. A system as claimed in claim 6, wherein the input means include a flame detector for detecting the presence or absence of a flame which is connected to said memory address bus for modifying the memory addressing of said control memory means so as to effect a lockout operation.

8. A system as claimed in claim 7, wherein the flame detector includes a detection circuit configured so as to detect a d.c. current indicative of flame presence and transfer means for transferring a detection signal to the address bus, and driver means for actuating a flame relay in dependence on this signal.

9. A system as claimed claim 3, wherein the output means includes a plurality of buffers for transferring the signals from the data bus into driving signals for a plurality of output relays.

10. A system as claimed in claim 9, wherein the output relays include an ignition relay, a pilot relay and main valve relay associated with a burner ignition system.

11. A system as claimed in 3 further comprising system check means connected to the control memory means for monitoring system operation and deactivation means coupled to said system check means for deactivating the burner upon the detection of an error.

12. A system as claimed in claim 11, wherein the system check means includes a first parity check circuit means connected to the data bus of the control memory means for monitoring the data word from the memory means at any accessed address and detector means connected to the check circuit to detect incorrect parity status indicative of a fault condition and termination means for effecting termination of system operation when a fault condition is detected.

13. A system as claimed in claim 12, wherein the first parity check circuit includes a plurality of cascaded EXCLUSIVE—OR gates, each for receiving a data input from the data bus and/or the output of another gate in the cascade.

14. A system as claimed in claim 13, wherein the termination means includes a bistable lockout relay connected to the check circuit via the detector means to effect a lockout condition on receipt of an error detection signal therefrom, said relay including reset means connected to the input means and resettable by a reset input thereto.

15. A system as claimed in claim 14, wherein the lockout relay is connected in series with a load relay driving circuit, the driving circuit including a detector for sensing short duration current signals from the first parity check circuit indicative of correct parity check operation; and for detecting continuity of the lockout relay coil and for actuation of the load relay when such signals are present.

16. A system as claimed in claim 15, wherein actuation means comprises: a diode pump circuit for driving the load relay from the detector signals.

17. A system as claimed in claim 12, wherein a second parity check circuit is provided for comparing the sequencing of the memory addressing with addresses derived from a check counter termination means for the termination of operation via the first check circuit if any error is detected.

18. A system as claimed in claim 3, wherein a relay contact status check circuit means is provided for determining any error in status in relays of the output means.

19. A system claimed in claim 18, wherein the check circuit includes a plurality of resistors interconnected with contacts on the relays and switchable on actuation of the relays by said control memory means into different combinations and including voltage detector means for monitoring a voltage derived via the resistors indicative of correct or erroneous operation.

20. A system as claimed in claim 14, wherein the voltage detector means includes a window comparator for producing a first output level, when no error is detected and a second output level when an error is present.

21. A system as claimed in claimed 19, wherein interconnection means are provided for transferring the detector output to the address bus of the memory means to modify the address accessed therein whereby prestored data can be used to terminate system operation.

22. A system as claimed in claim 21, wherein the interconnection means includes a frequency check circuit means for detecting detect system oscillator errors; and means for detecting contact error to stimulate frequency error so as to cause modification of the address access.

23. A system as claimed in claim 22, wherein the frequency check circuit includes a phase locked loop having a frequency comparison input and a frequency setting input modifiable by the status of the relay contact check circuit.

24. A system as claimed in claim 3, wherein display means are provided to indicate input and/or output status.

25. A system as claimed in claim 24, wherein the display means includes a display driver for receiving inputs from the address and data buses.

26. A burner control system as claimed in claim 3 including a parity check circuit comprising a plurality of logic gates connected to a plurality of data inputs for monitoring the parity status thereof and including at least one test signal input connected to at least one of said gates receiving a recurring test signal to cause a change in the parity check status if a gate is inoperative.

27. A burner control system as claimed in claim 3 including a relay operation system including a load relay for powering a device, a lockout relay having a coil for deactivating the device, a detector circuit for sensing short duration signals, generator means for providing a succession of short duration signals for input to the detector circuit via the coil of the lockout relay, and means for powering the load relay in response to the successive detected signals whereby a check on the continuity of the lockout relay and the powering of the output relay is effected by the same signal.

28. A burner control system as claimed in claim 3 including a relay contact check circuit including a plurality of relay contacts moveable to selected positions dependent on relay status, a resistor configuration comprising a plurality of resistors operable as a voltage divider network and arranged to be selectively interconnectable to each other dependent on selected changes of position of the relay contacts to checked, and voltage sensing means for detecting at least one voltage level from a junction of the divider network indicative of correct operation status of the relay contact.

29. A system as claimed in claim 1 wherein the address sequencer means includes an oscillator and a counter,
said oscillator being connected as an input to the counter and wherein the feedback means are provided from the data bus to the address sequencer means to reset the counter and/or hold the counter in dependence on preprogrammable instructions within selected memory storage locations.

30. A system as claimed in claim 1 wherein the memory means comprises:
a plurality of memory storage locations preprogrammable with control information and accessible by said address sequencer means via the address bus to effect a pre-start-up check of system components by simulating a sequence of fault conditions to determine that fault detection is operative.

31. A parity check circuit comprising:
a plurality of logic gates connected to a plurality of data inputs for monitoring the parity status thereof and including at least one test signal input connected to at least one of said gates for receiving a recurring test signal to cause a recurring inversion in the parity check status if a gate is inoperative.

32. A circuit as claimed in claim 31, wherein the logic gates are connected to form two circuit sectors and two test signal inputs are provided to receive different test signals to check the respective sectors.

33. A circuit as claimed in claim 31, wherein the logic gates connected to the data inputs comprise: a plurality of cascaded EXCLUSIVE—OR gates each receiving a data input and/or the output of an earlier gate.

34. A relay operation system including a load relay for powering a device, a lockout relay having a coil for deactivating the device, a detector circuit for sensing short duration signals, generator means for providing a succession of short duration signals for input to the detector circuit via the coil of the lockout relay, and means for powering the load relay in response to the successive detected signals whereby a check on the continuity of the lockout relay and the powering of the output relay is effected by the same signal.

35. A system as claimed in claim 34, wherein the detector means includes a high gain semi-conductor device and the means for powering the load relay includes a diode pump circuit for producing a d.c. level from the detected signals.

36. A system as claimed in claim 35, wherein drive means are provided in series with the lockout coil to operate the coil when the successive signals are modified.

37. A system as claimed in claim 36, wherein the lockout relay is a bistable device and a fusible current detector is provided in the means for powering the load relay to disable this relay if the lockout relay does not operate following receipt of the modified signals.

38. A parity check circuit comprising:
a plurality of logic gates connected to a plurality of data inputs for monitoring the parity status thereof and including at least one test signal input connected to at least one of said gates for receiving a recurring test signal to cause a change in the parity check status if a gate is inoperative wherein the logic gates are connected to form two circuit sectors and two test signal inputs are provided to receive different test signals to check the respective sectors and wherein further logic gates are connected to the sectors to check the outputs therefrom, the output of one sector being received by delay means operable to cause a series of short duration pulses to be generated at a frequency dependent on the test signal and indicative of correct parity conditions.

39. A parity check circuit comprising a plurality of logic gates connected to a plurality of data inputs for monitoring the parity status thereof and including at least one test signal input connected to at least one of said gates for receiving a recurring test signal to cause a change in the parity check status if a gate is inoperative and wherein the data inputs are updated at a first rate dependent on generated clock signals and oscillator means are provided for generating the recurring test signals for the logic gates at a higher frequency relative to the rate of updating of the data inputs.

40. A circuit as claimed in claim 39, wherein the oscillator means is configured to generate the clock signals and the test signals.

41. A parity check circuit comprising a plurality of logic gates connected to a plurality of data inputs for monitoring the parity status thereof and including at least one test signal input connected to at least one of said gates for receiving a recurring test signal to cause a change in the parity check status if a gate is inoperative and wherein one of the test signals is received by a further priority check circuit, said other of the test signals being derived from said further check circuit.

42. A parity check circuit comprising a plurality of logic gates connected to a plurality of data inputs for monitoring the parity status thereof and including at least one test signal input connected to at least one of said gates for receiving a recurring test signal to cause a change in the parity check status if a gate is inoperative and including a memory for storing the data received by the logic gates, a first counter for addressing the memory, a second counter for producing check addresses in response to an output from the memory and check means for comparing counts from both counters to determine if a predetermined parity relationship exists so as to produce an output for the logic gates.

43. A relay contact check circuit including a plurality of relay contacts, movable to selected positions dependent on relay status, a resistor configuration comprising a plurality of resistors operable as a voltage divider network and arranged to be selectively inter-connectable to each other dependent on selected changes of the position of the relay contacts to be checked, and voltage sensing means for detecting at least one voltage level from a junction of the divider network indicative of correct operation status of the relay contacts.

44. A circuit as claimed in claim 43, wherein at least one of the resistors is arranged to be shorted on actuation of certain of the relay contacts to provide a further voltage change, and a second voltage sensing means is provided to detect this voltage.

45. A circuit as claimed in claim 44, wherein the voltage sensing means includes a window comparator for producing an error state when the detected voltages are outside a predetermined range.

46. A circuit as claimed in claim 43, 44 or 45 including means for sequencing the relay contacts to effect pre-checking of the operation thereof before actual circuit use is permitted.

47. A circuit as claimed in claim 46 including means for disabling operation of the relay contacts if an error is detected.

48. A circuit as claimed in claim 47, wherein said disabling means includes a memory preprogrammable with shutdown information.

* * * * *